US010178693B2

(12) United States Patent
Pasad et al.

(10) Patent No.: US 10,178,693 B2
(45) Date of Patent: Jan. 8, 2019

(54) METHOD AND APPARATUS FOR HANDLING RANDOM ACCESS CHANNEL RESPONSES

(71) Applicant: InterDigital Patent Holdings, Inc., Wilmington, DE (US)

(72) Inventors: Kalpendu R Pasad, Cupertino, CA (US); Shankar Somasundaram, Sunnyvale, CA (US); Jin Wang, Princeton, NJ (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

(21) Appl. No.: 15/640,618

(22) Filed: Jul. 3, 2017

(65) Prior Publication Data

US 2017/0303310 A1    Oct. 19, 2017

Related U.S. Application Data

(63) Continuation of application No. 14/966,275, filed on Dec. 11, 2015, now Pat. No. 9,730,244, which is a
(Continued)

(51) Int. Cl.
*H04W 74/00* (2009.01)
*H04W 72/04* (2009.01)
(Continued)

(52) U.S. Cl.
CPC .......... *H04W 74/006* (2013.01); *H04L 5/003* (2013.01); *H04W 72/0466* (2013.01); *H04W 74/004* (2013.01); *H04W 74/0833* (2013.01)

(58) Field of Classification Search
None
See application file for complete search history.

(56) References Cited

U.S. PATENT DOCUMENTS 8,582,510 B2    11/2013  Pasad et al.
8,681,906 B2     3/2014  Malladi et al.
(Continued)

FOREIGN PATENT DOCUMENTS

CN    101300886       11/2008
JP    2010-502120      1/2010
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", 3GPP TS 36.300 V8.2.0, Sep. 2007, 109 pages.
(Continued)

*Primary Examiner* — Steve R Young
(74) *Attorney, Agent, or Firm* — Eric Berkowitz

(57) ABSTRACT

A method and apparatus for supporting a random access using a random access channel (RACH) are disclosed. The WTRU detects a format of control information in at least one control channel element (CCE) of a common area in a control portion of a downlink transmission. The control information indicates a resource allocation in a data portion of the downlink transmission. The WTRU recovers a random access response assigned to the WTRU from the indicated resource allocation of the data portion on a condition that the at least one CCE has a random access radio network terminal identifier (RA-RNTI) assigned to the WTRU.

20 Claims, 3 Drawing Sheets

Related U.S. Application Data continuation of application No. 14/076,832, filed on Nov. 11, 2013, now Pat. No. 9,276,712, which is a continuation of application No. 12/260,495, filed on Oct. 29, 2008, now Pat. No. 8,582,510.

(60) Provisional application No. 60/983,473, filed on Oct. 29, 2007.

(51) Int. Cl.
*H04L 5/00* (2006.01)
*H04W 74/08* (2009.01)

(56) References Cited

U.S. PATENT DOCUMENTS

| | | | |
|---|---|---|---|
| 9,131,464 | B2 | 9/2015 | Montojo et al. |
| 9,178,662 | B2 * | 11/2015 | Park ................ H04L 1/1812 |
| 2004/0001429 | A1 | 1/2004 | Ma et al. |
| 2005/0026597 | A1 | 2/2005 | Kim et al. |
| 2007/0064669 | A1 | 3/2007 | Classon et al. |
| 2007/0189205 | A1 | 8/2007 | Terry et al. |
| 2008/0084853 | A1 | 4/2008 | Kuchibhotla et al. |
| 2008/0200203 | A1 | 8/2008 | Malladi et al. |
| 2008/0273610 | A1 | 11/2008 | Malladi et al. |
| 2009/0088148 | A1 | 4/2009 | Chung et al. |
| 2009/0116424 | A1 | 5/2009 | Abeta et al. |
| 2011/0038275 | A1 | 2/2011 | Kim et al. |
| 2012/0076043 | A1 * | 3/2012 | Nishio ................ H04L 1/1861 370/252 |
| 2012/0127946 | A1 * | 5/2012 | Nishio ................ H04L 1/0038 370/329 |
| 2013/0301542 | A1 * | 11/2013 | Krishnamurthy ..... H04W 52/50 370/329 |

FOREIGN PATENT DOCUMENTS

| | | |
|---|---|---|
| WO | WO-2007/052746 | 5/2007 |
| WO | WO-2007/091821 | 8/2007 |
| WO | WO-2007/091831 | 8/2007 |
| WO | WO-2008/024788 | 2/2008 |
| WO | WO-2008/042967 | 4/2008 |
| WO | WO-2009/041779 | 4/2009 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.6.0, Sep. 2008, 137 pages.

"3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321 V1.0.0, Sep. 2007, 18 pages.

"3rd Generation Partnership Project; Technical Specification Group Radio Access Network; Evolved Universal Terrestrial Radio Access (E-UTRA); Multiplexing and channel coding (Release 8)", 3GPP TS 36.212 V8.0.0, Sep. 2007, 30 pages.

"3rd Generation Partnership Project; Technical Specification Group Radio Access Network; Evolved Universal Terrestrial Radio Access (E-UTRA); Multiplexing and channel coding (Release 8)", 3GPP TS 36.212 V8.4.0, Sep. 2008, 56 pages.

"3rd Generation Partnership Project; Technical Specification Group Radio Access Network; Evolved Universal Terrestrial Radio Access (E-UTRA); Physical channels and modulation (Release 8)", 3GPP TS 36.211 V8.0.0, Sep. 2007, 50 pages.

"3rd Generation Partnership Project; Technical Specification Group Radio Access Network; Evolved Universal Terrestrial Radio Access (E-UTRA); Physical Channels and Modulation (Release 8)", 3GPP TS 36.211 V8.4.0, Sep. 2008, 80 pages.

"3rd Generation Partnership Project; Technical Specification Group Radio Access Network; Evolved Universal Terrestrial Radio Access (E-UTRA); Physical layer procedures (Release 8)", 3GPP TS 36.213 V8.0.0, Sep. 2007, 13 pages.

"3rd Generation Partnership Project; Technical Specification Group Radio Access Network; Evolved Universal Terrestrial Radio Access (E-UTRA); Physical layer procedures (Release 8)", 3GPP TS 36.213 V8.4.0, Sep. 2008, 60 pages.

"3rd Generation Partnership Project; Technical Specification Group Radio Access Network; Evolved Universal Terrestrial Radio Access (E-UTRA); Physical layer procedures (Release 8)", 3GPP TS 36.213 V8.3.0, May 2008, 7 pages.

"3rd Generation Partnership Project; Technical Specification Group Radio Access Network; Feasibility study for evolved Universal Terrestrial Radio Access (UTRA) and Universal Terrestrial Radio Access Network (UTRAN) (Release 7)", 3GPP TR 25.912 V7.2.0, Jun. 2007, 64 pages.

"3rd Generation Partnership Project; Technical Specification Group Radio Access Network; Physical layer aspects for evolved Universal Terrestrial Radio Access (UTRA) (Release 7)", 3GPP TR 25.814 V7.1.0, Sep. 2006, 132 pages.

"3rd Generation Partnership Project; Technical Specification Group Radio Access Network; Requirements for Evolved UTRA (E-UTRA) and Evolved UTRAN (E-UTRAN) (Release 7)", 3GPP TR 25.913 V7.3.0, Mar. 2006, 18 pages.

"3rd Generation Partnership Project; Technical Specification Group Radio Access Network; Technical Specification Group Radio Access Network; Evolved Universal Terrestrial Radio Access (E-UTRA) Medium Access Control (MAC) protocol specification (Release 8)", 3GPP TS 36.321 V8.3.0, Sep. 2008, 36 pages.

"Chinese Office Action", Chinese Application No. 201310718401.6, dated Jul. 5, 2016, 19 pages.

"Chinese Office Action", Chinese Application No. 201310717604.3, dated Jul. 4, 2016, 5 pages.

"Chinese Office Action (English Translation)", Chinese Application No. 201310718401.6, dated Jul. 5, 2016, 12 pages.

"Chinese Office Action (English Translation)", Chinese Application No. 201310717604.3, dated Jul. 4, 2016, 7 pages.

"Japanese Notice of Rejection", Japanese Application No. 2015-238933, dated Oct. 4, 2016, 3 pages.

"Japanese Notice of Rejection (English Translation)", Japanese Application No. 2015-238933, dated Oct. 4, 2016, 3 pages.

3GPP Support Team, "Draft2 minutes of the 58th TSG-RAN WG2 meeting (Kobe, Japan, May 7-11, 2007)", 3GPP Tdoc R2-072901, 3GPP TSG-RAN WG2 meeting #58bis, Jun. 25-29, 2007, 132 pages.

Mistubishi Electric, UE and CCE specific scrambling codes for low complexity blind detection of downlink 7e, Aug. 20-24, 2007, 9 pages.

Mitsubishi Electric, "UE and CCE specific scrambling codes for low complexity blind detection of downlink control signaling", 3GPP Tdoc R1-074360; 3GPP TSG RAN WG1 #50bis meeting, Shanghai, China, Oct. 8-12, 2007, 9 pages.

Motorola, et al., "E-UTRA DL L1/L2 Control Channel Design—PICH/AICH/D-BCH", 3GPP Tdoc R1-073376, 3GPP TSG RAN1 Meeting #50, Athens, Greece, Aug. 20-24, 2007, 6 pages.

Motorola, et al., "Format 1C Blind Decoding restrictions", 3GPP Tdoc R1-082110, 3GPP TSG RAN1 Meeting #53, Kansas City, MO, USA, May 5-9, 2008, 2 pages.

Nokia, et al., "Reducing the decoding complexity of the PDCCH", 3GPP Tdoc R1-074317; 3GPP TSG-RAN Working Group 1 #50bis, Shanghai, China, Oct. 8-12, 2007, 7 pages.

Nokia, et al., "Signaling PCH, RACH response and dynamic BCH in DL-CCH.", 3GPP Tdoc R1-074319; 3GPP TSG RAN WG1 #50bis Meeting, Shanghai, China, Oct. 8-12, 2007, 3 pages.

Nokia, et al., "Signaling PCH, RACH response and dynamic BCH in L1/L2 control channel.", 3GPP Tdoc R1-073648; 3GPP TSG RAN WG1 #50 Meeting, Athens, Greece, Aug. 20-24, 2007, 3 pages.

Nokia, et al., "Stage 3 topics of Random Access Procedure", 3GPP Tdoc R2-072409; 3GPP TSG-RAN WG2 Meeting #58bis, Orlando, USA, Jun. 25-29, 2007, 4 pages.

(56) References Cited

OTHER PUBLICATIONS

Samsung, "Configuration of PDCCH Monitoring Set", 3GPP Tdoc R1-074078; 3GPP TSG RAN WG1 Meeting #50bis, Shanghai, China, Oct. 8-12, 2007, 3 pages.

Samsung, "Message 2 transmission when a dedicated preamble used", 3GPP Tdoc R2-073315; 3GPP TSG-RAN WG2 Meeting #59, Athens, Greece, Aug. 20-24, 2007, 2 pages.

Zte, "CCE allocation scheme in PDCCH for efficient blind detection", 3GPP Tdoc R1-074218, 3GPP TSG-RAN WG1 Meeting #50bis, Shanghai, China, Oct. 8-12, 2007, 3 pages.

* cited by examiner

METHOD AND APPARATUS FOR HANDLING RANDOM ACCESS CHANNEL RESPONSES

CROSS REFERENCE TO RELATED APPLICATIONS

This application is a continuation of U.S. patent application Ser. No. 14/966,275, filed Dec. 11, 2015, which is a continuation of U.S. patent application Ser. No. 14/076,832 filed on Nov. 11, 2013, now issued as U.S. Pat. No. 9,276,712 on Mar. 1, 2016, which is a continuation of U.S. patent application Ser. No. 12/260,495 filed Oct. 29, 2008, now issued as U.S. Pat. No. 8,582,510 on Nov. 12, 2013, which claims the benefit of U.S. Provisional Patent Application Serial No. 60/983,473 filed on Oct. 29, 2007, the entire contents or each of which is hereby incorporated by reference as if fully set forth.

FIELD OF INVENTION

The present application is related to wireless communications.

BACKGROUND

The objective of evolved universal terrestrial radio access (E-UTRA) and long term evolution (LTE) in wireless communications is to develop a radio access network towards a high-data-rate, low-latency, packet-optimized system with improved system capacity and coverage. In order to achieve these goals, an evolution of the radio interface as well as the radio network architecture is being considered. For example, orthogonal frequency division multiple access (OFDMA) and frequency division multiple access (FDMA) are proposed air interface technologies to be used in the downlink and uplink transmissions, respectively, instead of using code division multiple access (CDMA), which is currently used in 3rd Generation Partnership Project (3GPP) communication systems. Another change includes applying all packet switched service, which means all the voice calls will be made on the packet switched basis.

Packet switched communications operate on a random access channel. The physical channel specification for LTE specifies that the random access burst occupies a bandwidth corresponding to 72 sub-carriers (6 resource blocks). The set of six resource blocks is referred to as one time-frequency random access resource, or alternatively, resources of one LTE physical random access channel (PRACH). For the system flexibility, having a configurable number of time-frequency random access resources in one radio frame (10 ms) depends on the system bandwidth and the random access load. The existence of any additionally configured time-frequency random access resources needs to be explicitly signaled to wireless transmit/receive units (WTRUs).

There may be multiple random access preambles that are available for the access in one time-frequency random access resource, and the number of random accesses that expect the responses in a certain time window may vary greatly. If an evolved Node-B (eNB) always needs to signal all responses in one transport block per one random access-radio network temporary identity (RA-RNTI), the resultant size of the transport block may reduce the scheduling flexibility of the random access response.

SUMMARY

A method and apparatus for supporting a random access using a random access channel (RACH) are disclosed. Each of a plurality of wireless transmit/receive units (WTRUs) sends a random access request to a base station on an uplink RACH preamble. A RACH Response, sent by the base station, is received by each WTRU. A control signal portion of the RACH Response indicates the location of the RACH Response message in a corresponding data portion. The RACH Response control information is defined by single or multiple control channel elements (CCE), where each WTRU is allocated at least one CCE to provide its unique RACH Response control signal. The WTRU is configured to locate its intended CCE from among the multiple CCEs sent by the base station.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Herein, the term "RACH Response" is used interchangeably with an access indication channel (AICH) message.

Figure 1:
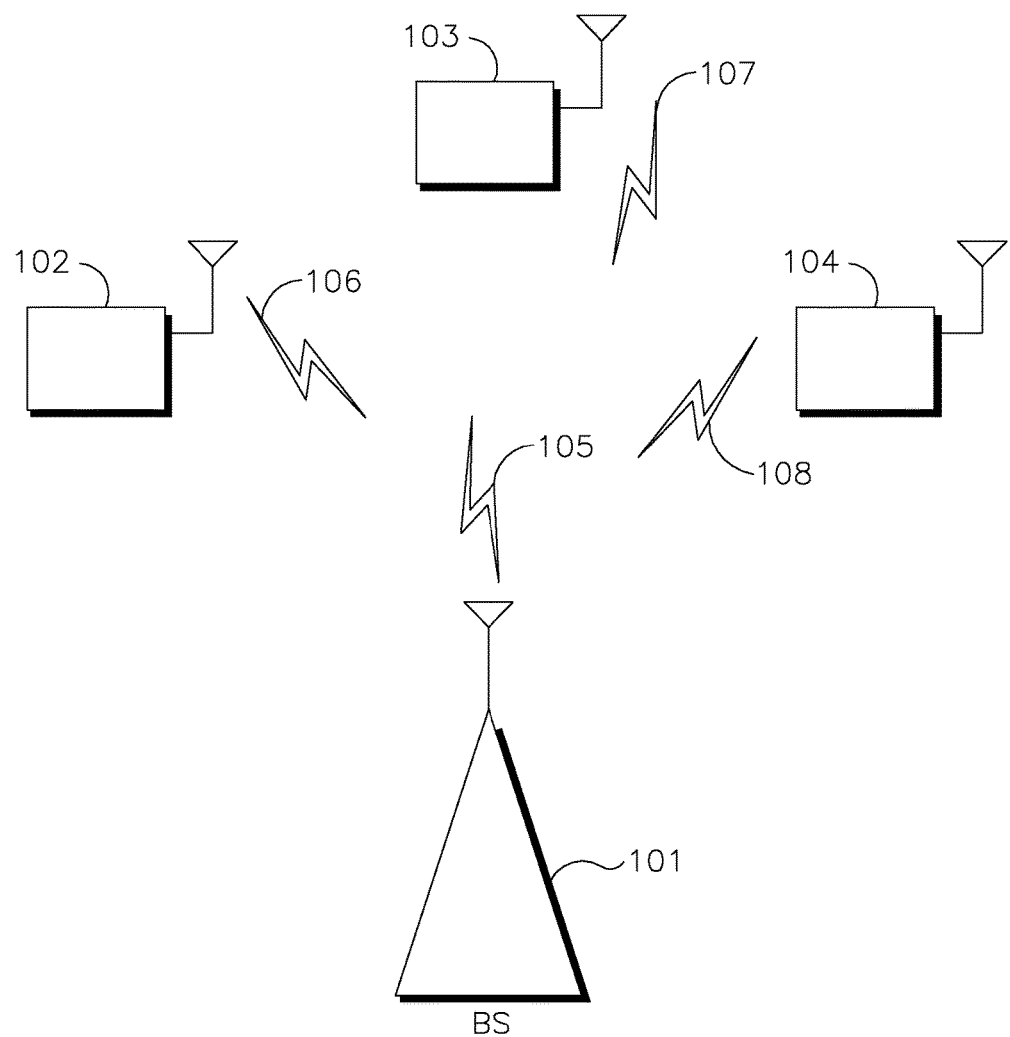
FIG. 1 shows a wireless communication network using random access.

FIG. 1 shows a wireless communication network 100, in which a base station 101 grants random access to a plurality of wireless transmit/receive units (WTRUs) 102-104. A RACH Response signal 105 is sent to the WTRUs 102-104 granting random access resource allocations in response to random access requests 106-108 sent by the WTRUs 102-104. The random access requests 106-108 are sent in RACH preambles from the same random access burst. A single time-frequency random access resource is granted per random access request by one of the WTRUs 102-104. Alternatively, multiple time-frequency random access resources may be granted per random access request.

Figure 2:
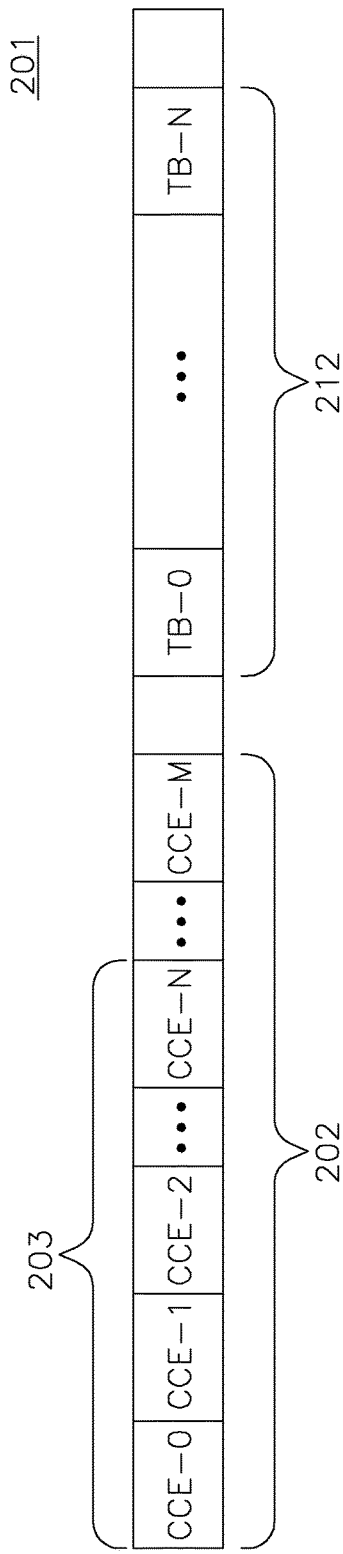
FIG. 2 shows a format for a RACH Response control channel and data channel.

FIG. 2 shows a RACH Response format 201 comprising a control channel 202 and a data channel 203 according to a first embodiment. By way of example, the control channel 202 may be a physical downlink control channel (PDCCH) and the data channel 212 may be a physical downlink shared channel (PDSCH). The control channel 202 includes a common control portion 203, in which a plurality of control channel elements (CCEs), CCE-0 to CCE-N, are defined for RACH Responses intended for WTRUs 102-104. Each set of CCEs contains location information for directing each respective WTRU to the RACH Response resource allocation found on the data channel 212 in transport blocks TB-0 to TB-N.

The CCEs may also include transport format information, such as the transport formats and modulation and coding scheme (MCS) to be used for decoding the RACH Response message on the data channel 203.

In the first embodiment, the WTRUs 102-104 perform blind decoding of the common control elements CCE-0 to CCE-N within the common control portion 203, searching for their respective CCE having the intended RACH Response control information. The starting location of the common control signal portion 203 may be pre-defined. For example, the starting location may be set to CCE-0, as shown in FIG. 2. The required RACH Response resources (i.e., the number of common control elements) may vary based on the number of WTRUs requiring the random access responses. A maximum number of CCEs may be specified accordingly.

Figure 3:
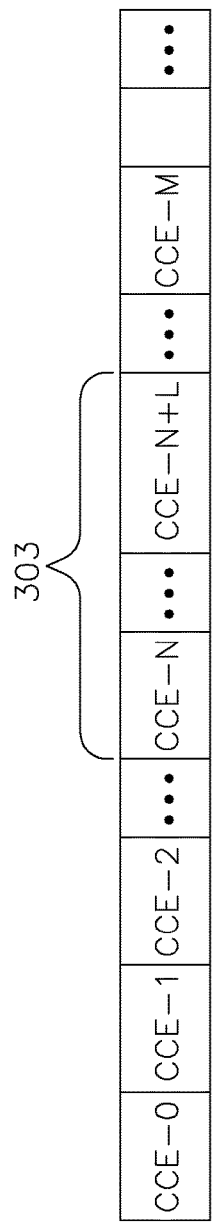
FIG. 3 shows an alternative format for a RACH Response control channel.

FIG. 3 shows an alternative embodiment to the starting point being defined as CCE-0, where a subset L of CCEs between CCE-N and CCE-M may be allocated for a RACH Response common control portion 303. For example, CCE-N to CCE-N+L may be allocated for the common control portion 303, as shown in FIG. 3. Alternatively, the common control portion 303 may be allocated to CCE-M-L to CCE-M, or any other subset of CCEs.

The starting location of the RACH Response common control portion 303, the number of CCEs, and/or the subset of L CCEs may be received by the WTRUs 102-104 in one of the broadcast channel (BCH) system information blocks (SIBs).

Figure 4:
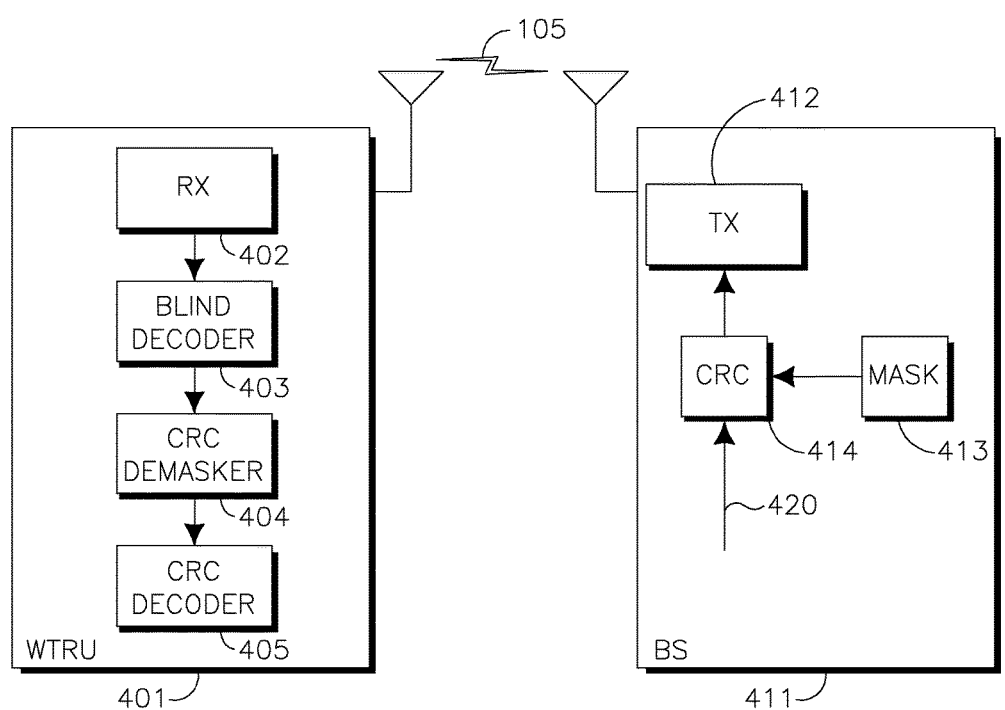
FIG. 4 shows a WTRU configuration for receiving a RACH Response.

FIG. 4 shows a WTRU 401 configured to receive and process the RACH Response 105 from a base station 411. At the base station 411, a cyclic redundancy code (CRC) generator 414 computes a CRC which is added as a set of bits onto CCE control information 420. The CRC is first is masked by an ID code at mask encoder 413. The masked CRC is then added to the CCE information 420. As an example, a 16-bit CRC code may be masked by a 16-bit ID, and then encoded onto the control information 420 for transmission at transmitter 412.

At WTRU 401, receiver 402 demodulates the received RF RACH Response signal 105, and blind decoder 403 processes the demodulated received signal 105, for example, by using a forward error correction (FEC) code or a Viterbi code. A CRC de-masker 404 processes the CRC bits by de-masking them according to the ID code. Next, a CRC decoder 405 decodes the de-masked CRC bits, allowing the WTRU 401 to perform an error check on the received CCEs of the RACH Response. The blind decoder 403, CRC de-masker 404, and CRC decoder 405 may be implemented as a single processor or as separate individual processors.

The ID code may be a Group ID or a WTRU-specific ID. The Group ID is used when a set of WTRUs served by the base station 411 are to receive a common RACH Response. The ID code may be a temporary ID assigned to a WTRU to identify the RACH Response addressed to it even if sharing a Group ID with other WTRUs. For example, the temporary ID may be a RACH radio network temporary ID (RA-RNTI). The ID code is received by the WTRU 401 with other system parameters when it initially acquires a cell and camps on the cell of the base station 411 via higher layer signaling.

Alternatively, a fixed time-frequency resource allocation may be dedicated to the CCEs corresponding to the random access grant control in the RACH Response. This fixed resource allocation may be independent of the other physical channel allocations, such as a physical HARQ indicator channel (PHICH) location, and avoids the need to have any knowledge of the configuration of those other physical channels. For example, the fixed time-frequency resource allocation dedicated to the RACH Response control may be allocated at a location immediately following a particular type of physical channel, such as a physical control format indicator channel (PCFICH).

For better performance and scheduling flexibility, the CCEs may be spread in time-frequency domain, within the control portion of a sub-frame. A one-to-one association (e.g., a time offset) between the random access request in the RACH preamble and a dedicated time-frequency resource allocation may be used to provide WTRU-specific RACH Response control.

In a second embodiment, multiple RACH Responses are sent to each of several different WTRUs. In a first alternative, each RACH Response control portion only contains resource allocation and transport format information for one WTRU RACH Response data portion. In another alternative, each RACH Response combines both control and data portions together for one WTRU. The RA-RNTI may be used to scramble each RACH Response control portion or the combined RACH Response control and data. Optionally, the RA-RNTI may be used to scramble the RACH Response data portion since a WTRU knows that the RACH Response data portion part is intended for it based on the RACH Response control portion.

Different antenna configurations may be applied to different RACH responses based on different WTRUs' capabilities. For example multiple-input multiple-output (MIMO) or space frequency block coding (SFBC) may be applied based on the WTRUs' capabilities.

For both alternatives, the first RACH Response data portion or RACH Response control portion may contain the information of how many total RACH Response data portions or RACH Response control portions are to be sent for different WTRUs. From this, the WTRUs know how many RACH Responses they need to detect to find the specific RACH Response intended to them. In doing this, the WTRUs associated with one RA-RNTI do not need to monitor all RACH Response channels, thus reducing the detection complexity and saving power.

If frequency hopping is employed for the RACH Response, the frequency hopping pattern for transmission of the RACH Response control or data portions may be indicated in the first RACH Response control portion or the combined RACH Response data and control. The transport format (such as MCS or power for different WTRUs) may vary for RACH Response data portion which is signaled in the RACH Response control portion. When combining the RACH Response control and data parts together, there is no need to signal the resource allocation for the RACH Response data portion.

The location of the RACH Response per WTRU may be fixed or spread across the time-frequency spectrum. It may be standardized or signaled in one of the BCH SIBs.

For the first and the second embodiments for the RACH Response, the network may decide which format should be used for the RACH Response. The exact RACH Response to be used may be signaled in the BCH so that the WTRU knows how to perform the blind decoding. For example, the WTRU may receive a downlink control indicator (DCI) format code, detected by the blind decoder 403, from which the WTRU may know the size (e.g., number of CCEs) of the RACH Response control portion and/or the starting location of the RACH Response control on the sub-frame.

Different RACH Response locations for different WTRUs may be associated with WTRU IDs (e.g., cell radio network temporary identity (C-RNTI), international mobile subscriber identity (IMSI), international mobile equipment identity (IMEI), or any other WTRU ID). The WTRU IDs may be known from the paging information. The relation between the WTRU ID and its RACH location may be pre-defined. In this way, the WTRU knows where to look for its RACH channel.

As an alternative, the initial RACH response location for the WTRU may be signaled in the BCH or derived from a relation between the WTRU ID and RACH location and then the WTRU may get the location of subsequent RACHs in the first RACH Response message signaled, (e.g., in case that the WTRU fails at the first RACH and has to send another RACH).

It should be noted that although the embodiments are described with reference to LTE, this is an example implementation, and the embodiments may be applied to any other wireless communication systems, such as high speed packet access (HSPA) systems or future development, and other wireless system when similar services and concepts are supported.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A network entity configured to be used with a wireless network comprising:
   a transmitter;
   a receiver configured to receive a random access preamble from a wireless transmit/receive unit (WTRU); and
   a processor, operatively coupled to the transmitter and the receiver, configured to:
   allocate, in response to the received access preamble, one or more resources to be used for a random access channel (RACH) response in a physical downlink shared channel (PDSCH) to be included in a downlink transmission,
   encode, within a subset of a plurality of control channel elements (CCEs), downlink control information (DCI) such that the DCI indicates the allocated one or more resources,
   encode the RACH response in the PDSCH, and
   generate a downlink transmission, the downlink transmission including a physical downlink control channel (PDCCH) and the PDSCH,
   wherein:
   the PDCCH includes the plurality of CCEs, and the subset of the plurality of CCEs corresponds to a common portion of the PDCCH such that the common portion of the PDCCH is intended for a plurality of WTRUs and is not addressed to a WTRU-specific identity for the WTRU; and
   the transmitter is configured to transmit the generated downlink transmission.

2. The network entity of claim 1, wherein the processor is configured to encode the subset of the plurality of CCEs corresponding to the common portion of the PDCCH.

3. The network entity of claim 1, wherein the subset of the plurality of CCEs comprises transport format information.

4. The network entity of claim 1, wherein the processor is configured to encode the RACH response using information relating to a modulation and coding scheme (MCS) included in the subset of the plurality of CCEs.

5. The network entity of claim 1, wherein the subset of the plurality of CCEs is spread in a time-frequency domain.

6. The network entity of claim 1, wherein the processor is configured to:
   determine a random access radio network temporary identifier (RA-RNTI); and
   mask a cyclic redundancy check (CRC) using the determined RA-RNTI.

7. The network entity of claim 6, wherein the RA-RNTI is utilized by the plurality of WTRUs.

8. The network entity of claim 1, wherein a starting CCE of the subset of the plurality of CCEs of the PDCCH corresponds to a first CCE in the PDCCH.

9. The network entity of claim 1, wherein the subset of the plurality of CCEs of the PDCCH corresponds to a number of consecutive CCEs in the PDCCH.

10. The network entity of claim 1, wherein the subset of the plurality of CCEs of the PDCCH includes the DCI that comprises a RACH response intended for at least one other WTRU.

11. A method performed by a system in a wireless network, the method comprising:
   receiving a random access preamble from a wireless transmit/receive unit (WTRU);
   allocating, in response to the received access preamble, one or more resources to be used for a random access channel (RACH) response in a physical downlink shared channel (PDSCH) to be included in a downlink transmission;
   encoding, within a subset of a plurality of control channel elements (CCEs), downlink control information (DCI) such that the DCI indicates the allocated one or more resources;
   encoding the RACH response in the PDSCH;
   generating a downlink transmission, the downlink transmission including a physical downlink control channel (PDCCH) and the PDSCH, wherein the PDCCH includes the plurality of CCEs, and the subset of the plurality of CCEs corresponds to a common portion of the PDCCH such that the common portion of the PDCCH is intended for a plurality of WTRUs and is not addressed to a WTRU-specific identity for the WTRU; and transmitting the generated downlink transmission.

12. The method of claim 11, further comprising encoding the subset of the plurality of CCEs corresponding to the common portion of the PDCCH.

13. The method of claim 11, wherein the subset of the plurality of CCEs comprises transport format information.

14. The method of claim 11, wherein the encoding of the RACH response comprises encoding the RACH response using information relating to a modulation and coding scheme (MCS) included in the subset of the plurality of CCEs.

15. The method of claim 11, wherein the subset of the plurality of CCEs is spread in a time-frequency domain.

16. The method of claim 11, further comprising:

determining a random access radio network temporary identifier (RA-RNTI); and masking a cyclic redundancy check (CRC) using the determined RA-RNTI.

17. The method of claim 16, wherein the RA-RNTI is utilized by the plurality of WTRUs.

18. The method of claim 11, wherein a starting CCE of the subset of the plurality of CCEs of the PDCCH corresponds to a first CCE in the PDCCH.

19. The method of claim 11, wherein the subset of the plurality of CCEs of the PDCCH corresponds to a number of consecutive CCEs in the PDCCH.

20. The method of claim 11, wherein the subset of the plurality of CCEs of the PDCCH includes the DCI that comprises a RACH response intended for at least one other WTRU.

* * * * *

UNITED STATES PATENT AND TRADEMARK OFFICE
CERTIFICATE OF CORRECTION

PATENT NO. : 10,178,693 B2
APPLICATION NO. : 15/640618
DATED : January 8, 2019
INVENTOR(S) : Kalpendu R. Pasad, Shankar Somasundaram and Jin Wang Page 1 of 1

It is certified that error appears in the above-identified patent and that said Letters Patent is hereby corrected as shown below:

In the Specification (i) Column 1, Line 16, change "or" to --of--.

Signed and Sealed this
Twenty-fourth Day of September, 2019

Andrei Iancu
*Director of the United States Patent and Trademark Office*